United States Patent [19]
Horn et al.

[11] Patent Number: 4,457,638
[45] Date of Patent: Jul. 3, 1984

[54] AUTOMATIC CENTERING OF TEXT COLUMN ENTRIES

[75] Inventors: Gary R. Horn; Kenneth O. Shipp, Jr., both of Austin, Tex.

[73] Assignee: International Business Machines Corporation, Armonk, N.Y.

[21] Appl. No.: 305,251

[22] Filed: Sep. 24, 1981

[51] Int. Cl.³ ............................................. B41J 25/18
[52] U.S. Cl. ...................................... 400/279; 400/2; 400/3; 400/63; 400/76; 400/83
[58] Field of Search .................... 400/2, 3, 63, 64, 67, 400/68, 76, 83, 279, 705.4, 705.5; 364/200, 900; 340/720, 721, 723, 724

[56] References Cited

U.S. PATENT DOCUMENTS

| | | | |
|---|---|---|---|
| 3,812,945 | 5/1974 | Koplow et al. | 400/279 X |
| 3,924,723 | 12/1975 | Cooper et al. | 400/63 |
| 3,968,868 | 7/1976 | Greek, Jr. et al. | 400/63 |
| 4,194,197 | 3/1980 | Bodin | 400/3 X |
| 4,223,393 | 9/1980 | Abe et al. | 400/279 X |

OTHER PUBLICATIONS

IBM Technical Disclosure Bulletin, "Column Layout Control for an Electronically Controlled Typewriter", Clancy et al., vol. 17, No. 12, May 1975, pp. 3625-3629.
IBM Technical Disclosure Bulletin, "Column Layout Scheme for Typewriter Having Mechanical Tab Stops", Johnson, vol. 22, No. 10, Mar. 1980, pp. 4632-4633.
IBM Technical Disclosure Bulletin, "Line, Point, and Tab Alignment", Adam et al., vol. 25, No. 1, Jun. 1982, pp. 213-215.
IBM Technical Disclosure Bulletin, "Format Control Functions", Adam et al., vol. 25, No. 1, Jun. 1982, pp. 217-220.
IBM Technical Disclosure Bulletin, "Logic for Centering Column Headings with a Word Processor," McCray, vol. 25, No. 2, Jul. 1982, p. 677.
IBM Technical Disclosure Bulletin, "Tab and Free Key Alignment", Chukran et al., vol. 25, No. 3A, Aug. 1982, p. 1325.
Kolpek, IBM Technical Disclosure Bulletin, vol. 16, No. 2, pp. 391-394, Jul. 1973, "Text Formating".

*Primary Examiner*—Ernest T. Wright, Jr.
*Attorney, Agent, or Firm*—R. Bruce Brodie

[57] ABSTRACT

A method for the automatic center tab insertion within a column example line comprising the steps of an operator cursor move to a column margin to define an end position; and responsive to a function key stroke, the machine steps of concurrently moving the cursor to the other column margin and counting the text characters of the example; calculating the distance to the column center position; concurrently moving the cursor to the calculated center position, and inserting a centered tab stop control character therein.

3 Claims, 5 Drawing Figures

---

```
Layout Table      |Voluntary Ed. Memo    |                    |
DSK001|           |              |Pg. 1 |Ln. 4      |Kyb  1  |Pitch   12

<<2....:....3....:....4....:....5...▼:|:|.6....:....7....:....8....:..:..>>....:..
aaaaaaa·aa                    aaaaaaa·aaaaaa              aaaaaaa·aa
Dept. 234                     Dept. 4320000               Dept. 511
$ 4.245.28  ■                 $ 7,543.540000              $ 4,333.22
  2,345.98   ──────▶            5,674.570000                1,870.97
  1,111.98  DIRECTION OF        7,089.080000                7,645.34
            CURSOR MOVEMENT
  3,443.89                      8,465.780000                4,673.67
  3,585.39                      4,674.570000                1,423.56
  2,834.34                      4,568.800000                8,656.78
  2,423.54                      4,745.660000                8,687.87

1.  Type longest entry of each column (a's will appear).
            For Normal Column:  Type entry (Press TAB to set each tab stop).
       For Decimal-Aligned Column:  Type number with decimal point.
            For Flush Right Column:  Type entry, then press RET.
2.  Press COLUMN to separate each column.
3.  Press LAYOUT again to automatically adjust spacing.
4.  Press ENTER to type new table, or press ↓
       to move cursor to last line of existing table, then press ENTER.
```

Create Column Layout Frame for Existing Table

Create Column Layout Frame for Existing Table

```
Layout Table        |Voluntary Ed. Memo
DSK001|                                |Pg.  1  |Ln. 4       |Kyb ?   |Pitch  12
<<2...:...3...:...4...:...5...V:|.|.6...:...7...:...8...:...>>...:...
aaaaaa··aa              aaaaaa··aaaaa                        aaaaaa··aa Dept. 234               Dept. 4320000                         Dept. 511

$ 4,245.28              $ 7,543.540000                        $ 4,333.22

2,345.98      ↑          5,674.570000                          1,870.97
          DIRECTION OF
1,111.98  CURSOR MOVEMENT 7,089.080000                          7,645.34

3,443.89                 8,465.780000                          4,673.67

3,585.39                 4,674.570000                          1,423.56

2,834.34                 4,568.800000                          8,656.78

2,423.54                 4,745.660000                          8,687.87

1.  Type longest entry of each column (a's will appear).

For Normal Column: Type entry (Press TAB to set each tab stop).

For Decimal-Aligned Column: Type number with decimal point.

For Flush Right Column: Type entry, then press RET.

2.  Press COLUMN to separate each column.

3.  Press LAYOUT again to automatically adjust spacing.

4.  Press ENTER to type new table, or press →
    to move cursor to last line of existing table, then press ENTER.
```

FIG. 5

AUTOMATIC CENTERING OF TEXT COLUMN ENTRIES

FIELD OF THE INVENTION

This invention relates to word processing, and more particularly to a method for automatic center tab insertion within a column example line in which the machine given the example width determines and marks the centering point.

BACKGROUND ART

Kolpek, in the IBM Technical Disclosure Bulletin, Vol. 16, No. 2, pp. 391–394, July 1973, describes centering operation upon segments of text within a column in an interactive word processing system. Kolpek required the operator to center the type element, after which the system recorded for playback printing coded keystroke representations of the centering function, backspaces, and the text character segment. Upon the centering mode selection, the system was placed in a non-printing mode wherein the system counted half the number of characters entered and recorded half of the count as backspace control characters. The text stream was recorded in a multiple shift register page memory. Relatedly, Cooper, et al., in U.S. Pat. No. 3,924,723, issued on Dec. 9, 1975, generated a compacted code of centering controls and characters using less memory especially for wide-margined documents. Significantly, both systems required operator centering of the typing element and the control key invocation of the machine determination and recording of text segment widths.

In the co-pending Horn and Shipp application U.S. Ser. No. 305,260, filed on Sept. 24, 1981, entitled "Column Formatting by Typed Example", there is described a multipler text column formatting method executed in an interactive word processing system having a display screen, a keyboard, a memory for storing formatted information, and an intercoupling microprocessor. The method steps include formatting the column widths and gutters, defining a multicolumn table by way of an operator keyed in example line of repeated text and control characters; and vector encoding and saving of the example line in the memory suitable for revision upon recall.

A multi-column table may be conveniently described by a set of width parameters specifying a set of adjacent vertical columns starting at the table left margin and extending to the right margin. "Widths" are defined in terms of the width of a character included within a predetermined font or in absolute escapement units such as 1/1440 inches per unit. A gutter width is a multiple byte number designating the amount of white space in character widths associated with a vertical column. Likewise, a column width is preferably a multiple byte number designating the width of a column text as the number of character units counted relative to the preceding gutter. The first gutter width is specified as a unit count relative to the left margin. Other gutter widths specify unit counts relative to the right edge of the previous column widths.

In Horn, et al type of prompting interactive word processor, multiple text column tables are formatted prior to text entry by invoking a column layout function mode. Consonantly, menued prompts prominently displayed guide the operator to structure the column widths and gutters by repeatedly keying text characters and then spacing over to the next column position and repeatedly keying text characters again defining the width of yet another column. This single entry permits the columns and gutter widths to be automatically aligned with tab stops. The formatted column example line is then vector encoded and saved. If it is subsequently desired to revise a saved table, its encoded format line is recalled, rebuilt, and revised by entering repeated text and control characters to define an altered width of an existing column or a new column. In turn, the revised column example line may be encoded and saved. There is also provided an automatic one character wide gutter insertion when creating a new column to prevent the operator from failing to include a gutter after formatting his adjacent column.

THE INVENTION

It is an object of this invention to devise a machine implementable method for setting tab stops along a displayable example line such that subsequent keyboard data entries into a column are automatically center aligned. Such a method should be invocable in an interactive word processing system in which an operator keyboard entered and system displayed example line of repeated text and control characters defines column widths and gutters of a multiple text column table.

The objects are satisfied by a method comprising the steps of an operator cursor move to a column margin to define an end position; and responsive to a function keystroke, the machine steps of concurrently moving the cursor to the other column margin and counting the text characters of the example; calculating the distance to the column center position; concurrently moving the cursor to the calculated center position, and inserting a centered tab stop control character therein; and resetting the cursor to the end position.

Advantageously, since the system can ascertain the column widths, it further determines the midpoint of the column example and the insertion of the center tab stop. This is in contrast to the prior art which requires operator positioning of the centerpoint and then requires the system to determine the column text segment width. Further, if the column example is moved as by way of revising of an existing table, the center tab settings are automatically adjusted in order to retain the relative position of the tab stop within the example.

BRIEF DESCRIPTION OF THE DRAWING

FIG. 5 sets out a display frame for an existing table in which is shown the column example line for the table in addition to keyboard entries.

DESCRIPTION OF THE PREFERRED EMBODIMENT AND INDUSTRIAL APPLICABILITY

Brief System Machine Description

Figure 1:
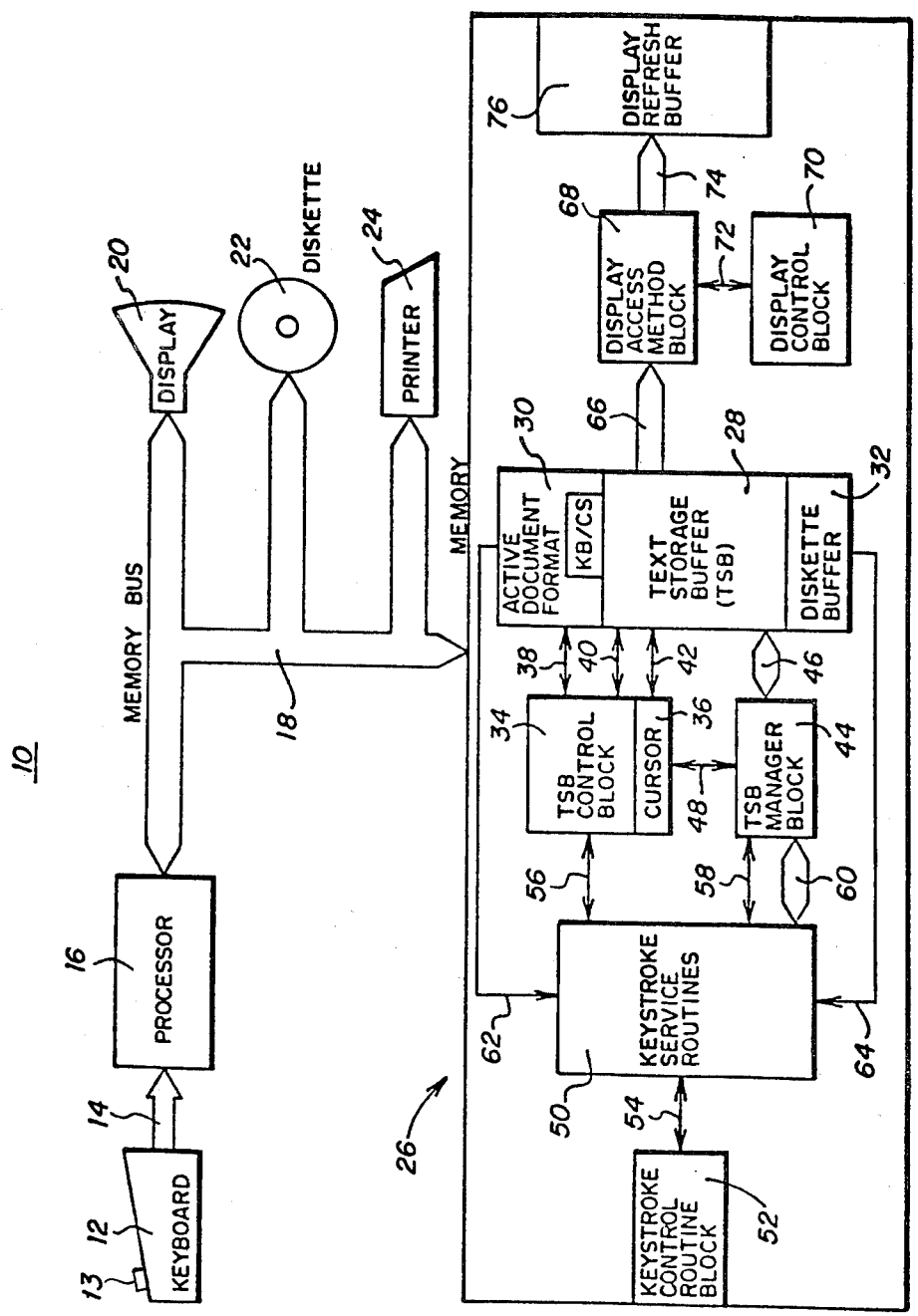
FIG. 1 depicts a word processor system configuration including soft and hard copy output facilities, internal and external memory, and a bus intercoupling a microprocessor and keyboard input.

Referring now to FIG. 1, there is shown a word processing system 10 which includes a keyboard 12 for receiving text character entries and transmitting the text through a path 14 to a microprocessor 16. A memory bus 18 couples processor 16 to a CRT display 20, a diskette drive 22, a printer 24, and a random access memory 26.

In FIG. 1, text storage buffer control block 34 serves as the data area for the text storage buffer 28. A cursor control section 36 is included within the text storage buffer control block 34. Block 34 is linked through a channel 38 to the active format section 30 and through a channel 40 to the text storage buffer 28. The cursor block 36 is connected through a channel 42 to the text storage buffer 28. A text storage buffer manager block 44 is coupled through a channel 46 to the text storage buffer 28. Block 44 is further coupled through channel 48 to the TSB control block 34.

As each character is entered through keyboard 12, it is received at the memory 26 by the actions of one or more keystroke service routines 50. A keystroke control routine block 52 is linked to the keystroke service routine block 50 through a channel 54. The keystroke service routine block 50 is further linked through channel 56 to the text storage buffer control block 34 and through channels 58 and 60 to the TSB manager block 44.

The active format section 30 is connected through channel 62 to the keystroke service routine block 50. The diskette buffer 32 is, in turn, coupled through the channel 64 to the keystroke service routine block 50.

The text characters and control information in TSB 28 are communicated through channel 66 to a display access method block 68. This serves as an interface for the display 20. Corresponding access method blocks for the keyboard 12, diskette drive 22, and printer 24 are substituted when communications with these units is required. Display control block 70 is connected through path 72 to the access method block 68.

A global clock simultaneously supplies clocking or strobe signals for synchronizing the diverse logic transmission and memory accessing elements of the machine. Indeed, an external clock 91 provides an input over paths 90 to each of the major elements. As can be seen with reference to FIG. 2, a conventional microprocessor architecture is set out. For example, a program counter 104, when incremented by the external clock 91 over path 90, specifies the location either in a register or in a memory for the next instruction to be executed. Also, data pointer register 106 and stack pointer register 108, respectively, contain pointers to the address location for recently entered characters and the location in memory of the instruction stack. The instruction stack is a last in, first out stack used for procedure and function calls, the storage of static variables, and temporary values during expression evaluation. Register 110 is a status register indicative of availability or content error.

An operator enters a text stream through the keyboard 12. Each page of text is stored and processed in the memory 26. As the text stream is received in the memory 26, it is simultaneously presented to display 20. After the buffering of the text in text storage buffer 28 of memory 26, the stream can be saved on diskette drive 22 or hard copy printed out on printer 24.

Memory 26 includes a number of data areas and functional programs for operating with the text stored in system 10. The text and related control functions are saved in a text storage buffer 28 which includes an active format storage section 30 and a diskette buffer 32. The keyboard character set (KB/CS) for the documenting process is available in the active format section 30.

As each character is entered through the keyboard 12, it is processed by one or more of the keystroke service routines stored in block 50 as executed by processor 16. The text stream stored in the TSB 28 is simultaneously entered into display refresh buffer 76. This buffer 76 drives display 20. The display control block 70 and display access method block 68 provide a window which may be scrolled relative to the contents of the TSB 28. It should be noted, that both the diskette drive 22 and printer 24 have dedicated buffer areas assigned to them. In this regard, block 70 serves to store flags and status information as required by the operation of block 68.

The contents of display access method block 68 are transmitted to display refresh buffer 76 over path 74. Typically, the display access method block 68 is also responsible for setting out the scale line which is a ruled line appearing at the top of the display 20 for which the tab stops are specially designated. A tab stop is stored in a data stream in a formatting control portion thereof. In this form, tab stops can comprise multiple bytes of information, one of the bytes designating location with the remaining bytes designating tab type. Conventionally, tab stop location bytes represent displacement from the left margin in the form of an integer number of characters. The tab type, such as centering, is indicated by two vertical bars in FIG. 5.

As the operator enters each keystroke at keyboard 12, a corresponding signal is transmitted to processor 16 over path 14 which enters the keystroke command to the memory 26. Upon receipt, the keystroke routine is invoked for block 50 in order to process the keyed command. It is processed by processor 16 according as to whether it is a control command or a graphic entry. The processing result is entered into TSB 28. While graphics and commands are built up in TSB 28, the text information is retained in display refresh buffer 76 and presented at display 20.

The method for automatic centering of a column segment during multiple text column layout mode is invoked after the operator keys in a column width example of repreated text and control characters. The invocation consists of keystroking a dedicated function key 13 on keyboard 12 shown in FIG. 1. This could also take the form of depressing a control key and a predetermined alphanumeric key.

Through control command, the operator can transfer information about the memory, display, diskette drive 22 and printer. Selected pages can be called from the diskette drive 22 and the memory 26 so that the operator can make changes and corrections to the test and then reenter the corrected text into diskette drive 22 or have the corrected text hard copied on printer 24.

Partial Machine Register Organization, Data And Control Flow

Figure 2:
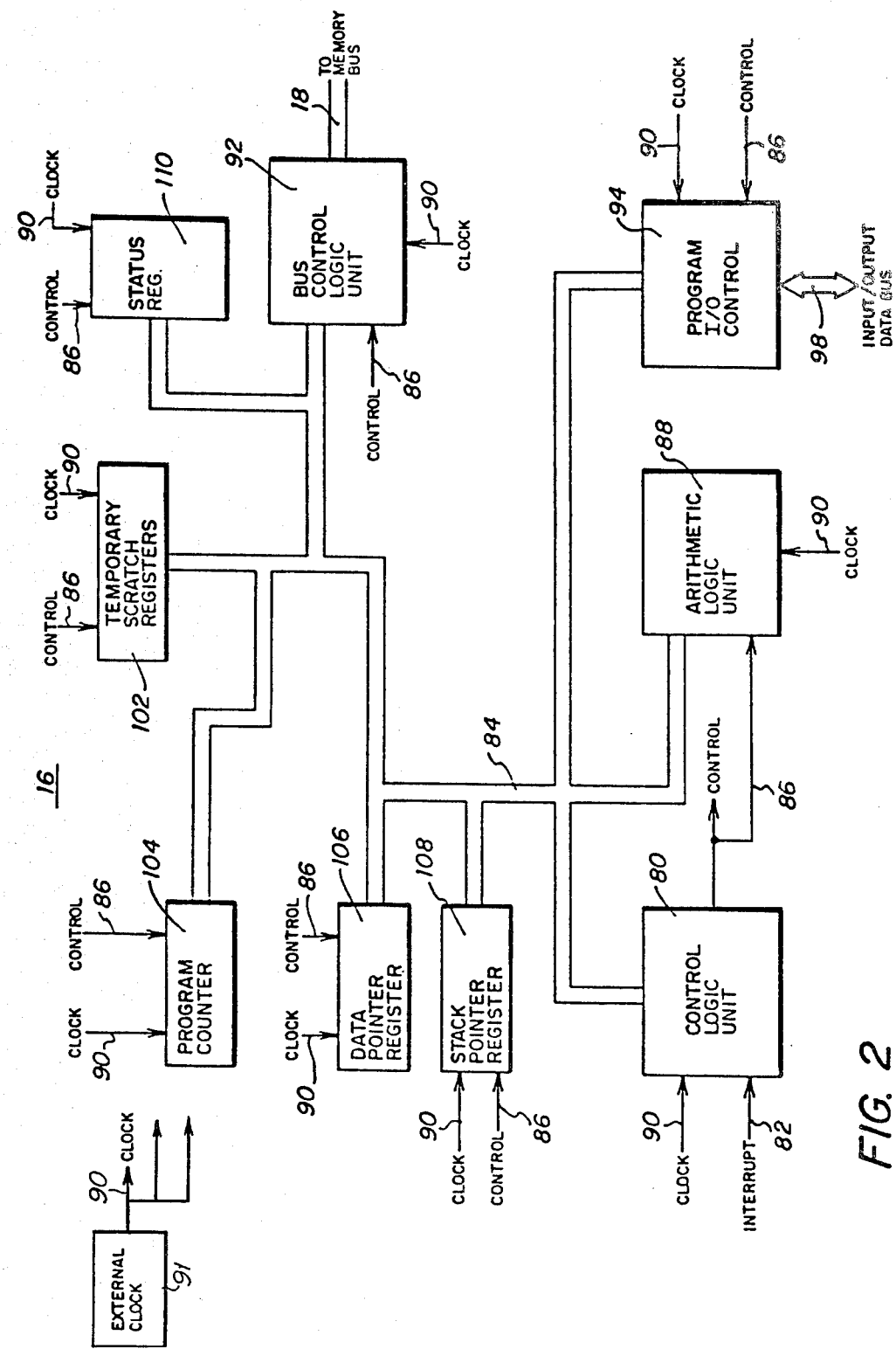
FIG. 2 delineates the partial register organization of the microprocessor shown in FIG. 1.

Referring now to FIG. 2, there is illustrated the contemporary machine register organization of processor 16. Such a processor may be commerically implemented as for example by an Intel Corporation Microprocessor Model 8086. According to FIG. 2, the processor 16 includes a control logic unit 80, which responds to interrupt on a device bus 82 from keyboard 12. Logic unit 80 is also connected to a data and address bus 84 intercoupling other logic elements.

In response to a fetch instruction from a random access memory 26, logic unit 80 generates control signals to other elements. The signals are coupled by way of path 86, illustratively connecting ALU 88. Synchronous operation of unit 80 and other logic elements is insured by way of clock pulses from an external clock source 91 distributed over paths 90. Data and instructions to be processed by processor 16 are entered over logic unit 92. Data also may be entered by way of a programmed input/output control logic 94. Logic 92 couples storage elements of RAM 26 and receives instructions by processing data from the I/O control logic 94 or from RAM 26.

Device control information from processor 16 is passed by I/O control logic 94 and path 98. Input on the data bus 98 from keyboard 12 is processed internally through processor 16 by instructions over bus 84 to logic unit 80 by ALU 88. The ALU 88 in response to a signal on path 86 and in accordance with instructions received on bus 84 executes arithmetic operations stored in temporary scratch register 102.

Prompting Word Processor Display

Figure 4:
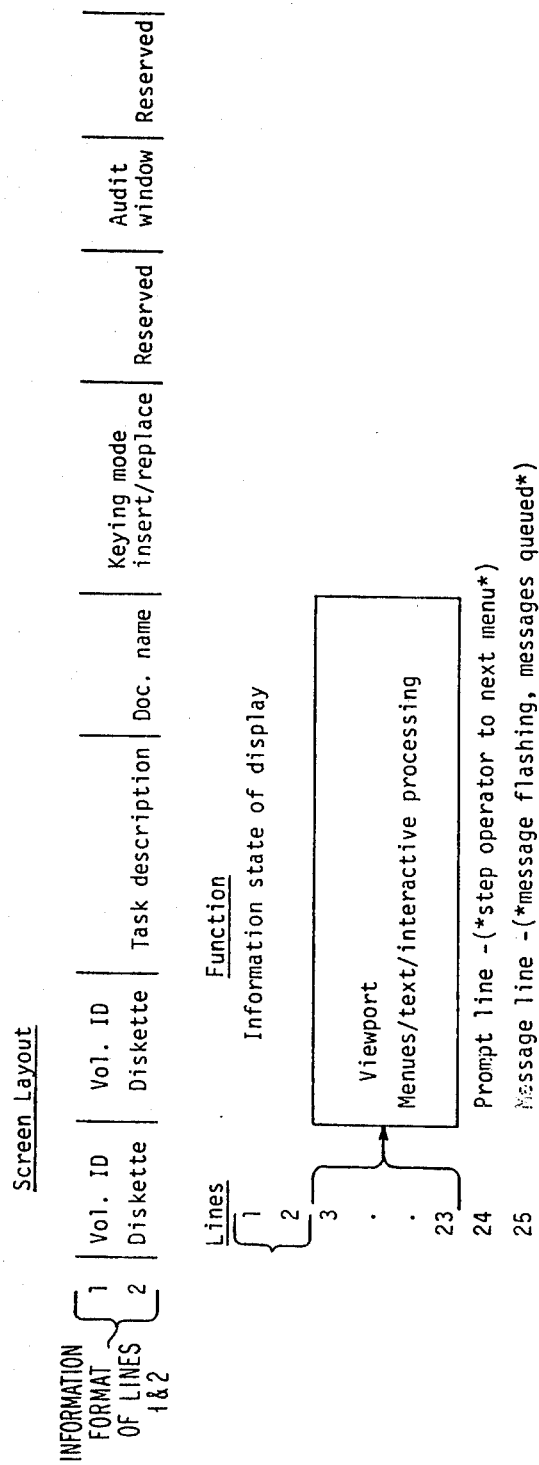
FIG. 4 is a display screen (soft copy) layout of information as viewed by a word processor operator.

In a prompting word processor, display device 20 would be of the CRT type and be capable of setting out monospaced characters. In this regard, reference should be made to FIG. 4. A typical display is partitioned such that lines 1 and 2 are status lines reflecting the information state of the display. The information state of the display designated for lines 1 and 2 is shown in an exploded format denominated screen layout. From left to right the format indicates the volume name of each of up to two diskettes, a description of the current document composing task the operator is undertaking, the name of the document being amended, and the keying mode such as inserting or replacing material. The remainder are either reserved fields or audit windows. Next, lines 3 through 23 define a viewport in which are displayed menus, text, and information necessary for interactive processing. Line 24 is a prompt line which provides information stepping the operator to the next menu function or activity. Lastly, line 25 is a message line which displays messages or which indicates queued messages. Referring now to FIG. 5, there is in addition to the information state shown in lines 1 and 2, a scale line appearing as the third line of the display image. This line shows the format of a currently cursored line. In all cases, excepting that of special functions such as column layout and margin and tabs, the scale line is displayed so as to match the text and be segmented as the text is segmented. It is apparent that the viewport which occupies lines 4 through 23 permits the operator to see portions of the document. As mentioned, contemporary word processors with text editors permit viewing different portions of a document by segmenting or scrolling of the screen contents relative to a memory such as TSB 28.

Multitext Column Layout Formatting By Example

The purpose of column layout functions in an interactive prompting word processing system is to provide an opportunity for an operator to specify all of the attributes of a column table format so as to permit implementing column functions such as delete, move, copy, and revise. These attributes include the widths of each column, the tab stops within each column, and the spacing (gutters) between columns. In the copending patent application, Horn and Shipp, U.S. Ser. No. 305,260, filed on Sept. 24, 1981, there is described a method for formatting multiple columns either when creating a new table or for revising existing tables by way of modifying selected column widths or inserting a new column therein. The method involves initializing the system by selectively suppressing text edit controls and reserving resources such as an allocation of memory. The table formatting is by way of operator key-in of repeated text characters and controls as an example. The "example line" is then encoded and saved. If the table is to be newly created, then the operator keys a new format under a displayed scale line designated the "column example line" by repetitively keying text and control characters. The tab rack and column and gutter width information is encoded as control bytes associated with the BEGIN TABLE (BT) control character. This information is saved. Thus, if the table is to be revised, then the "column example line" is displayed and reconstituted according to the previously saved encoded information. At that time, the operator can key in revisions by way of example. Again, the revised layout is saved.

The Centering of Text Column Entries

Referring again to FIG. 5, there is shown a layout frame for an existing table in which the column example line appears as a sequence of repeated lower case character "a"s. Each sequence is spaced apart and defines a separate column. The distance between examples constitutes a column gutter while the repeated characters themselves determine the maximum entry width of the column.

Figure 3:
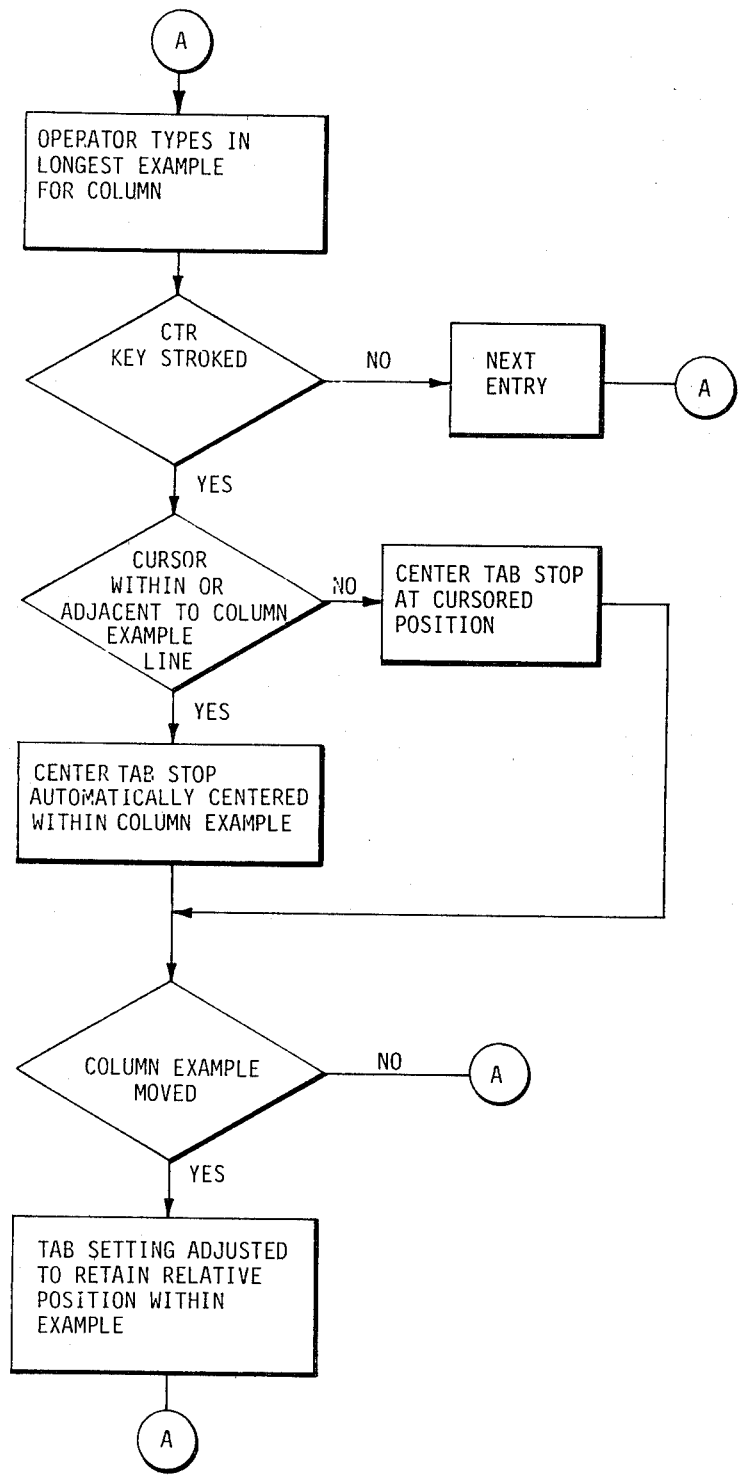
FIG. 3 exhibits a brief flow diagram of the method steps of the invention.

Turning to FIG. 3, there is shown the method steps of the invention. Here, an operator, after entry of the example line, moves a cursor to the column margin and strokes a dedicated function (centering) key 13. The system 10 concurrently moves the cursor to the other column margin and counts the text characters of the entered example. The system 10 then calculates the distance to the column center position and concurrently moves the cursor to the center position and inserts a center tab stop control character thereat. The operator is, of course, free prior to the stroking of the function key 13 to position the cursor at any arbitrary point between column examples. If this is done, a center tab stop at the cursored position would be inserted. Provision is also made that in the event a column is moved or revised, the center tab stop setting is automatically adjusted by the system 10 to retain its relative position within the example.

A PASCAL Source Code Implementation

A PASCAL source code illustration of the machine response to the operative function key stroke is set out as follows:

```
procedure centering (i : integer; buffer :
packed array [1..m] of char);
var j,k : integer;
begin
while buffer[i]<>' ' and buffer [i] <>
ord(rcr)
do i:=i+1;
j:=i; k:=0;
repeat
begin i:=i−1; k:=k+1; end
until buffer[i]=' ' or buffer [i] =
ord(rcr);
k:=k+1; k div 2;
```

```
-continued
i:=i+k;
if k=0 then
  begin for k:=m-1 downto i+1 do
    buffer[k]:=buffer [k-1]
  end;
  buffer[i]:=centertabstop;
  i:=j;
end (* centering *);
(*i = cursor position
j = end position
k = character count
' ', rcr belong to an ordered character set
where ' ' = space
rcr = return carry
1..m = an integer subrange*)
```

The PASCAL implementation sets out a procedure labeled "centering". This procedure is invoked by a procedure call passing a numerical parameter value of "i" to the procedure as the current cursor position at display 20. The variables j and k are integer type and respectively denote the cursor end position and the character count of a keyed in text stream also appearing on the display 20. The text stream is represented by the variable "buffer". In PASCAL, a character stream must be represented as a packed array of type char. PASCAL is a highly typed language. By this is meant that all data elements other than selected reserved words and marks must be labeled as belonging to one of a predetermined set of data types. For PASCAL there are nominally five types. These are INTEGER, REAL, CHARACTER, ARRAY, or RECORD. By rigorously requiring all names of data objects to be classified into these types, their compilation is assisted by immediately identifying any inconsistency and prompting a very efficient compact object code string. In this regard "type char" is a permissible abbreviation for character type. For the details of data typing, reference should be made to standard PASCAL language text such as Jensen, et al, "Pascal User Manual and Report", 2nd Edition, New York, Springer-Verlag, 1974, and Wirth, "Algorithms Plus Data Structures Equal Programs", Prentice Hall, 1976.

The first "while-do loop" moves the cursor to the end of the example character sequence. Such an end would be recognizable by either the space character or as the ordinal value of an automatic return carry signal (rcr). The end position of the example is ascertained by setting it equal to the cursor position, i.e., j:=i. The "repeat-until loop" determines the length of the example by counting and testing from the right end back to the left end. Note, that the cursor positioning assumes a monotonic (integer) increase from left to right. Since counting is proceeding from right to left, then for each character the cursor position will be diminished by one while a character count will be incremented by one. Also, it is the value in the array location "buffer[i]" that is being tested or examined. If buffer[i] is a space (' ') or an ordinal rcr value, then the left-hand edge of the character string has been detected.

The next two lines of code determine the center point. Since the center tab stop is to be inserted, the method takes into account an example of width 0 to that of m characters in length. Consequently, the "if-then" conditional state defines insertion upon the condition of positioning the cursor between columns. The next statement references the insertion of the center tab stop at the current array value location. The last statement positions the cursor position at the previously determined end position.

A PASCAL source code implementation was selected to express aspects of the invention in view of the compactness of its expression and currency among persons having ordinary skill in this art. Other method implementations can be formulated in assembly level language as, for example, set out in Osborne, "8080 Programming For Logic Design", Sybex, Berkelet, California, 1976.

While the invention is particularly described with reference to a preferred embodiment, it is appreciated that the method focuses on the keying of text followed by the stroking of a dedicated function key to which the interactive word processor responds by the automatic establishment of a set tab at the centerpoint of the example. In prior art systems, the operator tediously determined the centerpoint, escaped the carrier to the centerpoint, and then stroked a dedicated function key. It will be understood by those skilled in this art that various other changes in the form and details may be made therein without departing from the spirit and scope of the invention.

Having thus described our invention, what is claimed as new and desired to secure the Letters Patent is:

1. A method for automatic centering of a column segment during a multiple text column table layout mode on an interactive word processing system formed from a keyboard, display, memory for storing formatted information, and an intercoupling microprocessor comprising the steps of:
   operator keying in of a column width example of repeated text and control characters; and
   responsive to the stroking of a dedicated function key, the machine implementable step of determining the midpoint in the example and inserting of a center tab stop at the midpoint position.

2. A method according to claim 1, wherein said method includes the further step of adjusting the tab setting in order to retain its relative position within the example.

3. A method for setting tab stops along an example line such that subsequent keyboard data entries into a tab stopped column are automatically center aligned in an interactive word processing system having a display screen, a keyboard, a memory for storing formatted information, and a microprocessor intercoupling said display screen keyboard, and memory in which an operator keyboard entered and system displayed example line of repeated text and control characters defines column widths and gutters of a multiple text column table comprising the steps of:
   moving a cursor to a column margin;
   concurrently moving the cursor to the other column margin and counting the text characters of the example;
   calculating the distance to the column center position; and
   concurrently moving the cursor to the center position and inserting a center tab stop control character.

* * * * *